United States Patent [19]

Suman, Jr.

[11] E Re. 30,711

[45] Reissued Aug. 18, 1981

[54] WELL COMPLETION METHOD AND SYSTEM

[76] Inventor: George O. Suman, Jr., 3701 Kirby Dr., Suite 458, Houston, Tex. 77098

[21] Appl. No.: 901,017

[22] Filed: Apr. 27, 1978

Related U.S. Patent Documents

Reissue of:

[64] Patent No.: 3,918,522
Issued: Nov. 11, 1975
Appl. No.: 437,231
Filed: Jan. 28, 1974

[51] Int. Cl.[3] ..... E21B 33/127; E21B 33/14; E21B 43/11

[52] U.S. Cl. ..... 166/285; 166/187; 166/289; 166/297

[58] Field of Search ..... 166/187, 285, 289, 292, 166/297, 305 R

[56] References Cited

U.S. PATENT DOCUMENTS

| | | | |
|---|---|---|---|
| 1,944,442 | 1/1934 | Manning | 166/187 |
| 2,019,418 | 10/1935 | Lang | 166/187 X |
| 2,922,478 | 1/1960 | Maly | 166/187 |
| 3,050,118 | 8/1962 | Elkins | 166/187 |
| 3,197,317 | 7/1965 | Patchen | 166/292 |
| 3,270,814 | 9/1966 | Richardson et al. | 166/187 X |
| 3,389,752 | 6/1968 | Lebourg | 166/297 |

FOREIGN PATENT DOCUMENTS

| | | | |
|---|---|---|---|
| 2054899 | 5/1971 | France | 166/187 |
| 985121 | 3/1965 | United Kingdom . | |
| 985122 | 3/1965 | United Kingdom . | |

*Primary Examiner*—Stephen J. Novosad
*Assistant Examiner*—George A. Suchfield
*Attorney, Agent, or Firm*—Guy E. Matthews

[57] ABSTRACT

A well completion method is provided wherein an inflatable packer is positioned in an open borehole of a well opposite a formation from which or into which a fluid is to flow. Cement is then forced into the packer to expand its packing element into contact with the wall of the borehole at the formation. The cement is allowed to set and then at least one perforation is made from the interior of the packer through the cement and packing element to the formation. A well system is also provided in which the well is equipped with such a packer so installed and having such a perforation.

8 Claims, 2 Drawing Figures

WELL COMPLETION METHOD AND SYSTEM

Figure 1:
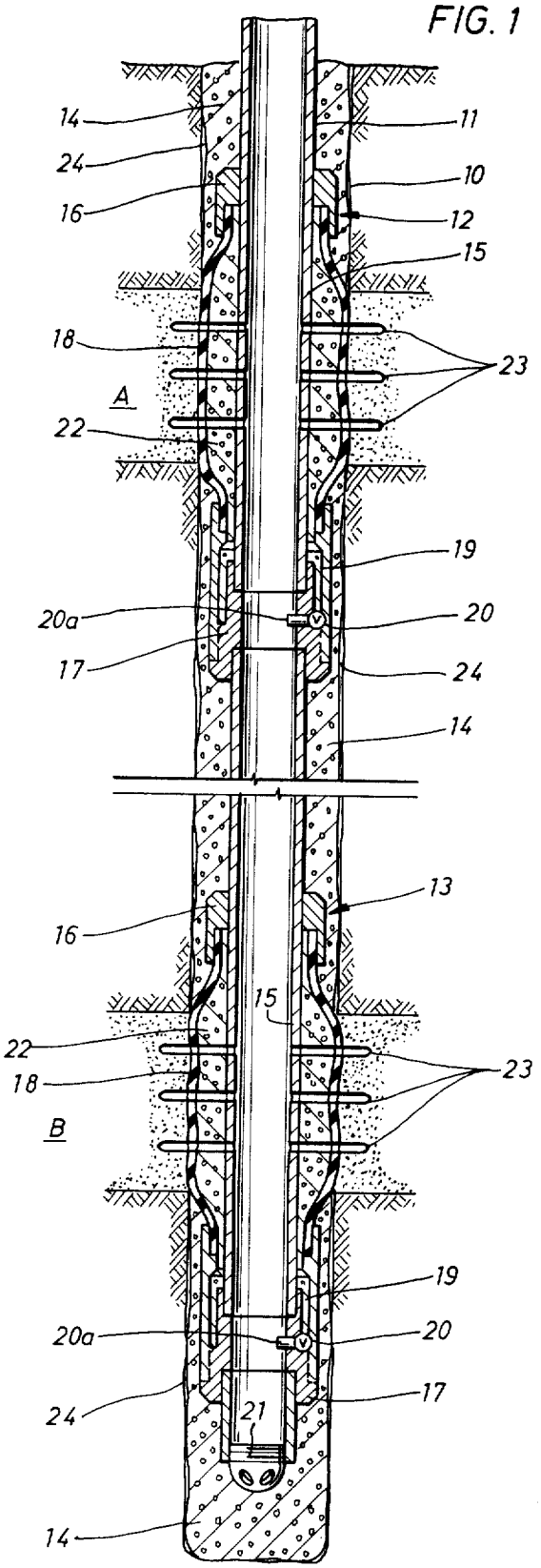

Matter enclosed in heavy brackets [ ] appears in the original patent but forms no part of this reissue specification; matter printed in italics indicates the additions made by reissue.

This invention relates to a well completion method and system wherein the annulus between a tubular well string and the wall of the borehole is packed off with a greater degree of dependability and efficiency than is achieved through conventional primary cementation techniques. In another of its aspects, it provides a more positive support for the formation being packed off, the degree of which support can be selected and attained without extensive manipulation.

The present almost universal manner of completing a well to pack off certain formations of interest is to flow cement into the annulus between the casing and the wall of the borehole. Although this practice has been subject to considerable investigation and improvement for many years, it still remains one of the most unreliable steps involved in completing a well. For example, the cement should totally displace the drilling mud (or other fluid which is in the well just prior to cementation) from the vertical interval which is to be perforated and perhaps of somewhat lesser importance, over other vertical intervals which are not to be perforated. However, even when the best known techniques of cementing are applied, overall mud displacement efficiency remains too low, particularly in certain areas such as the Gulf Coast of the United States.

Excessively poor mud displacement can result in vertical mud channels, usually along the cement-borehole interface, mud pockets, localized cement dilution and in general, discontinuities in the cement between the casing and wall face. Also, there can be poor bonding of the cement to the casing and to the well face. These imperfections result in a poor cement job with attendant difficulties known to those skilled in the art.

Accordingly, it is an object of this invention to provide a well completion method and system in which the primary pack-off between a tubular well string and a formation positively mechanically displaces substantially all of the drilling mud or other well fluid from the desired vertical interval to be packed off.

Another object is to achieve such a result while maintaining the cement used for such pack off out of physical contact with the drilling mud thereby preserving the integrity of the cement.

Another object is to provide a method and system which results in a completed interval which can be more effectively and positively subjected to secondary formation treatments, such as acidizing, hydraulic fracturing and the like, than can many intervals completed by conventional primary cementing techniques.

Another object is to provide a method and system which permits continuous and controlled support of a formation over a broad range of degree of support which is largely unaffected by other completion and stimulation operations.

Figure 2:
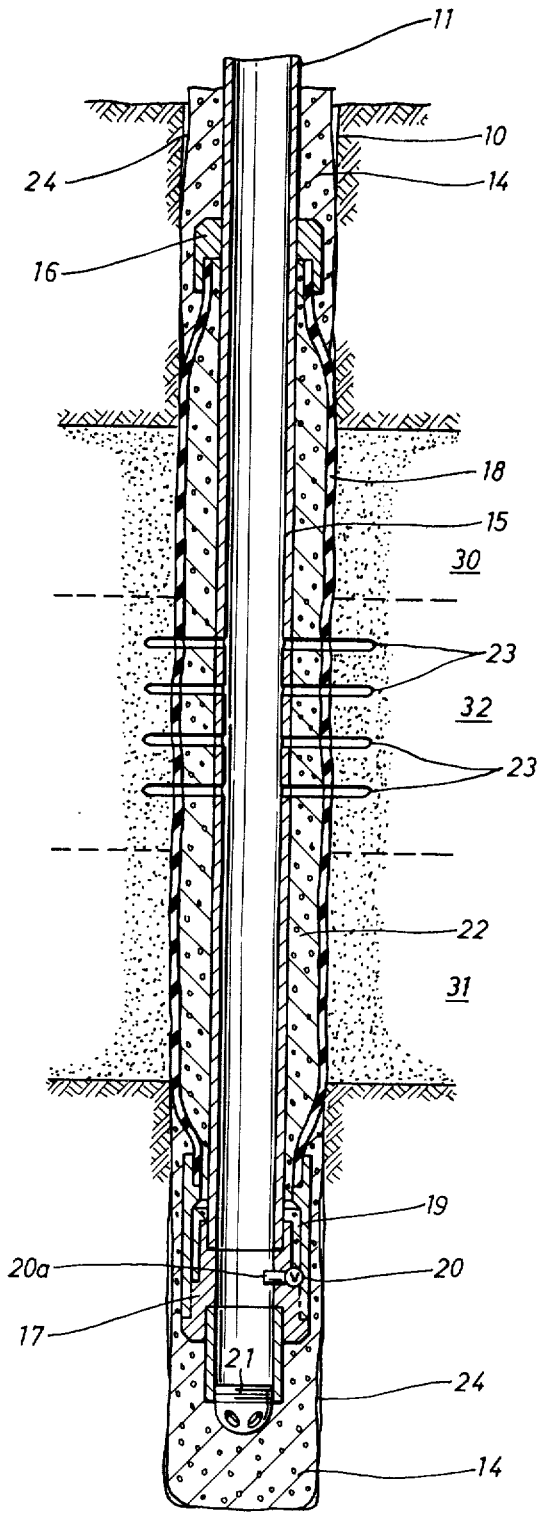

Other objects, advantages and features of the invention will become apparent to those skilled in the art upon consideration of the detailed description, the claims and the drawings wherein:

FIG. 1 illustrates a preferred embodiment of the invention as applied to two formations in a well; and FIG. 2 illustrates another application of the invention to complete a single formation which lies intermediate of and adjacent to two other formations and which are isolated from the single formation.

In accordance with the primary aspect of this invention, a radially expansible packer is positioned in the borehole opposite the formation to be perforated. The packer is then expanded radially into contact with the face of the formation thus causing the drilling mud or other well fluid to be mechanically displaced from the interval in the casing-borehole annulus along which the packer extends. Preferably the expansion is to a degree not only to displace the mud but to provide mechanical support for the formation to a desired degree. Then a continuously open perforation is formed extending from the interior of the packer to its exterior to be in fluid communication with the formation. In the most preferred mode, the packer is of the inflatable type and cement is forced into the packer to expand the same as aforesaid. After the cement has set to a hardened mass, the perforation is formed to extend through the packer mandrel, the cement forced into the packer and the resilient packing element.

Referring to the drawings, there is shown a well which has been dually completed in upper and lower formations A and B, respectively, which formations are penetrated by a borehole 10. It will be understood that the method and system of this invention are applicable to single zone completions as well as multiple zone completions.

Thus, after the borehole has been drilled, it will contain drilling mud or other fluid for formation control and other purposes. A string of casing 11 is then run into the hole after a pair of packers, preferably inflatable packers 12 and 13, have been made up therein and spaced so that when the casing has been landed, the packers will be opposite their respective formations. The well can then be subjected to a primary cement job by conventional techniques so that cement 14 fills the annulus between the casing string and the wall of the borehole. During this operation, packers 12 and 13 remain in deflated condition so that cement can flow therepast to cement the intervals between the packers and above the packers.

The packers are preferably of the inflatable type and can be of the construction shown at page 2847 of the 1972–73 Composite Catalog of Oilfield Equipment and Services with suitable adjustment of their length to accommodate formations of various thicknesses. Other inflatable packer constructions can be used. In any event, the packer will usually comprise a mandrel 15 which can be provided by a length of casing sealingly and slidably extending through an upper connector assembly 16 to be connected to a lower connector assembly 17. A radially expansible packing element 18 extends between and is connected to the upper and lower connector assemblies 16 and 17. The packing element can comprise a sleeve of rubber or other suitable material which, in its contracted position, is of a somewhat larger outer diameter than the casing but which, when expanded, forcibly engages the face of the borehole. Expansion of the packer is accomplished in accordance with this invention by forcing cement through passageway 19 into the interior of the sleeve until the latter is suitably expanded. A valve system 20 can be provided to open at a preset pressure to allow cement to flow into the packer and to close to prevent backflow of cement from the packer before the cement has set. Such a valve system is indicated in the above page of the Composite Catalog.

During the primary cementing operation, a suitable plug 21 or other shut off device is placed in the casing and pumped down the same by additional cement on top of the cementing plug. As the cementing plug passes the packers, it will shear off a plug 20a on each of them so that cement 22 is caused to flow into the packer to inflate and expand the packer. This will cause the packing elements or sleeves 18 to not only displace the primary cement between the packing element and the formation but also to displace any mud or other well fluid that may exist in such an interval so that there is a continuous and uninterrupted contact of the packing element with the formation face. Also, additional cement can be forced into the packer to cause it to exert a desired degree of supportive force against the formation. After all of the packers have been set, cement remaining in the casing can be drilled out in a conventional manner. Alternatively, it can be circulated out using tubing or a macaroni string to conduct the wash fluid into the well for such operation.

After the cement in the packers has set to a solid mass, one or more perforations 23 are formed from the interior of the element 18 to the respective formations and preferably thereinto as shown. Thereafter, various other completion and formation treatment operations can be conducted in a conventional manner.

In FIG. 1, each of the packers is shown to be of a length to extend vertically from a point above to a point below their respective formations. This effectively isolates the formations from other formations above or below the packed off formations. In this connection, FIG. 1 also illustrates, perhaps in a somewhat exaggerated manner, a poor cement job in the intervals between the packers. Thus the cement 14 in the annulus does not completely fill the annulus since there are outer annuli or channels 24 which remain filled with mud. It is through such channels that one formation communicates with another in the case of a poor cement job. However, as shown in FIG. 1, these channels are terminated by the packers above and below their respective formations so that such communication is prevented.

FIG. 2 illustrates a single zone completion with the packer also completely isolating formations 30 and 31 lying above and below the formation 32 to be perforated. This assures not only formations 30 and 31 (which may be, for example, fresh water formations) from not only communicating with formation 32 but also with all other formations. Since the elements of FIG. 2 correspond generally with those described in connection with FIG. 1, they have been assigned like numerals.

While cement has been referred to specifically as the fluid for expanding the packer, other fluids capable of being flowed into the packer and thereafter setting to a solid mass can be used. Also, while the perforations have been referred to as being formed, such as by conventional shaped charge perforating techniques, it is possible to form the perforation by using a Permeator of the type sold by the Permeator Corporation of Houston, Texas. In using Permeators, their housing is screwed into a threaded opening in the packer mandrel and their smaller piston is attached to an opening in the packing element. Then after the packer has been expanded as aforesaid, the acid soluble plugs in the Permeators can be dissolved in conventional fashion to open the perforation from the interior of the packer to the formation. In this case, one need not wait on the cement to set into a hardened mass before the plugs are dissolved.

The practice of this invention has several advantages over conventional completion techniques among which are:

1. Optimum conditions exist for the best bond between the mandrel 15 and the cement 22 since the surface of the mandrel is not "wetted" by mud or oil.

2. Elimination of mud channels and pockets, and when applied, an elevated state of formation stress by the packer minimizes the chance for vertical cement sheath tension failures during formation treatments at elevated pressures.

3. The cement adjacent to perforations will not be weakened due to mud contamination.

4. The opportunity for hydraulic bond failure will be minimized.

5. Formation pre-stress prevents cylindrical openings from forming at the cement-formation interface during high pressure treatments.

6. Shattering of the cement in the packer would not create communication channels to other formations because of the packing element seals to the formation face along its entire depth.

7. Acid treatments cannot dissolve the rubber-formation interface.

The invention having been described, what is claimed is:

1. A method of completing a well having a formation penetrated by an open borehole comprising positioning a packer in the borehole opposite said formation, said packer having an elongated resilient packing element expansible radially by forcing a fluid into the packer, then flowing a fluid into the packer to cause the packing element to expand radially into contact with the wall of the borehole at said formation while causing the packer to confine said fluid to be within said packing element, said fluid being capable of setting as a solid mass, permitting said fluid to set to a solid mass while so confined by said packer, and then forming at least one perforation extending from the interior of the packer through the confined solid mass and the packing element to the formation.

2. The method of claim 1 wherein said fluid comprises portland cement.

3. The method of claim 2 including the further step of flowing a fluid through the perforation into or out of said formation.

4. The method of claim 1 wherein the packer extends vertically in the borehole from a point above to a point below said formation.

5. The method of claim 4 wherein the well has a second formation vertically adjacent the first mentioned formation and wherein the packer is caused to extend across both of such formations to assure that a fluid cannot flow from one formation to another.

6. In a well system wherein a formation is penetrated by an open borehole, a packer assembly positioned in the open borehole opposite said formation, said packer assembly having a radially expansible *sleeve type* packing element [mounted on] *surrounding a portion of a mandrel* and having [a] *the extremities of said packing element in* fluid tight mechanical connection with the exterior of [a] *said* mandrel, a time setting solid mass between the mandrel and packing element in sufficient quantity that the packing element is radially expanded into *continuous supporting* engagement with said formation, and at least one continuously open perforation extending from the interior of the packer assembly through the mandrel, the solid mass and the packing element to said formation.

7. The system of claim 6 wherein the packing element is of a length to extend vertically in the borehole from a point above to a point below said formation.

8. The system of claim 7 wherein a second formation vertically adjacent the first mentioned formation is also penetrated by the borehole and wherein the packing element is of a length to extend across both of said formations to assure that a fluid cannot flow along the wall of the borehole from one formation to another.

* * * * *